United States Patent [19]
Cartier

[11] Patent Number: 4,950,714
[45] Date of Patent: Aug. 21, 1990

[54] CROSS-LINKED POLYVINYL BUTYRAL SHEET

[75] Inventor: George E. Cartier, Springfield, Mass.

[73] Assignee: Monsanto Company, St. Louis, Mo.

[21] Appl. No.: 810,431

[22] Filed: Dec. 18, 1985

Related U.S. Application Data

[62] Division of Ser. No. 684,777, Dec. 21, 1984.

[51] Int. Cl.$^5$ ................................................ C08F 8/00
[52] U.S. Cl. ................................................ 525/61
[58] Field of Search ............................ 525/61; 264/1.1

[56] References Cited

U.S. PATENT DOCUMENTS

| | | | |
|---|---|---|---|
| 2,487,864 | 11/1949 | Gaylor | 525/61 |
| 3,153,009 | 10/1964 | Rombach | 525/61 |
| 4,533,697 | 8/1985 | Degeilh | 525/61 |

FOREIGN PATENT DOCUMENTS

| | | |
|---|---|---|
| 0034389 | 4/1975 | Japan . |
| 50-34389 | 4/1975 | Japan . |
| 56-70001 | 6/1981 | Japan . |
| 0001766 | 1/1983 | Japan . |
| 569450 | 1/1983 | Japan . |

Primary Examiner—Joseph L. Schofer
Assistant Examiner—J. M. Reddick
Attorney, Agent, or Firm—Michael J. Murphy; William J. Farrington

[57] ABSTRACT

Polyvinyl butyral (PVB) resin lightly cross-linked through intermolecular linkages developed through increase PVB molecular weight and the modulus of a plasticized sheet formed therefrom intended for use in laminated safety glass assemblies.

1 Claim, No Drawings

CROSS-LINKED POLYVINYL BUTYRAL SHEET

CROSS-REFERENCE TO RELATED APPLICATION

This is a division of application Ser. No. 684,777, filed Dec. 21, 1984.

This invention relates to polyvinyl butyral (PVB) resin and more particularly to (i) selectively cross-linked PVB, (ii) a plasticized sheet formed therefrom and (iii) a method of forming such resin and sheet.

Plasticized PVB sheet is very well known as an intermediate for use with glass or plastic panels (hereinafter called "laminating panels") in laminated safety glass assemblies. It is also well known that the modulus properties of such a sheet and of the PVB resin from which it is made must accommodate a range of temperature-related performance requirements. For example, if the resin is too stiff, the power required to melt and extrude it into sheet form may be excessive or the resulting sheet may be difficult to handle during laminating and may not provide a quality laminate during preparation of the safety glass assemblies. More specifically, during lamination at the usual, relatively high (e.g. ca.192° C.) temperatures, it is important that the PVB flow adequately to collapse the sheet and fill the space between the two laminating panels, but not so much as to flow out the edges of the laminate. In the past, such a delicate matching of the high temperature properties of the sheet to the laminating conditions has frequently not been possible with the result that the laminating operating conditions had to be inconveniently continuously adapted to the properties of the particular sheet being laminated. To the best of present knowledge, a means to control the high temperature properties of a plasticized PVB sheet has not been available in the past to one of ordinary skill in the art.

SUMMARY OF THE INVENTION

Now, however, improvements have been made in the manufacture of PVB resin and sheet made therefrom which minimize or overcome the aforementioned shortcomings of the prior art.

Accordingly, it is a principal object of this invention to tailor the high temperature modulus of PVB sheet to accommodate various laminating conditions by incrementally selectively increasing the molecular weight of the PVB resin.

Another object is to achieve such PVB molecular weight increase by cross-linking two PVOH chains during or just before the acetalization reaction forming the PVB resin.

Other objects of this invention will in part be obvious and will in part appear from the following description and claims.

These and other objects are accomplished in the broadest sense by providing a PVB resin which is lightly cross-linked through intermolecular linkages developed through the hydrated form of formaldehyde, as well as a plasticized sheet formed therefrom which contains such linkages.

In more specific form, a method is provided of forming extruded polyvinyl butyral sheet which comprises acetalizing polyvinyl alcohol with butyraldehyde in the presence of formaldehyde hydrate to produce polyvinyl butyral resin lightly cross-linked through diacetal intermolecular linkages, mixing such resin with plasticizer and other optional additives to form an extrusion formulation having a melt viscosity at 120° C. of between about 2.0 and about $3.5 \times 10^5$ poise ($0.2$–$0.35 \times 10^5$ Pa.s) and extruding such formulation in melt form through an extrusion opening to form a sheet without rupturing such cross-links.

The extent of cross-linking is adequate to increase the viscosity of the polyvinyl butyral by about 2% to about 85% over its viscosity in the absence of such diacetal linkages.

DETAILED DESCRIPTION OF PREFERRED EMBODIMENTS

The polyvinyl butyral which is lightly crosslinked through intermolecular linkages has the following proposed representative formula for a section of polymer chain:

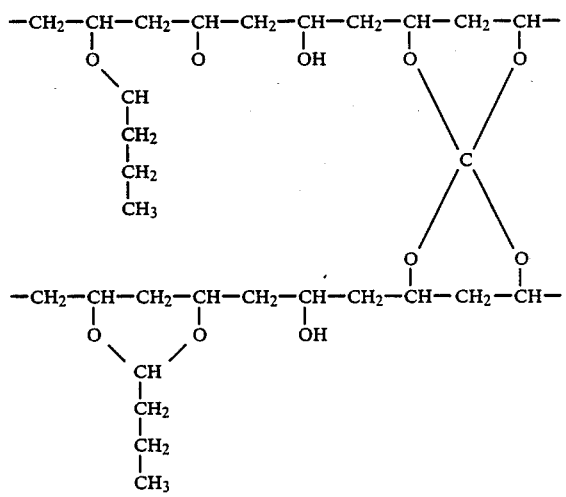

As depicted above, the polyvinyl butyral portion of the structure, present at a level of 65–95 weight % of vinyl butyral units in the polymer, is formed through reaction of butyraldehyde with two adjacent hydroxyl groups on the same PVOH chain. When acetalization takes place in an aqueous medium to which formaldehyde has been added and is therefore present as methylene glycol, i.e. HO—$CH_2$—OH, otherwise known as formaldehyde hydrate, it is thought that the individual hydroxyl groups surprisingly react as individual carbonyl groups to form two acetal groups on two different PVOH chains. In other words, the diacetal cross-linkages are formed through reaction of one hydroxyl group of the methylene glycol with a pair of adjacent OH groups on one PVCH chain and the other hydroxyl group of the methylene glycol with such a pair of hydroxyls on an adjacent, neighboring PVOH chain. Thus, it has unexpectedly been found that the pair of hydroxyls of the hydrated form of the monoaldehyde, formaldehyde, can serve as cross-linking sites to join adjacent PVOH chains. By means of such cross-linking as just described, the molecular weight of the PVB is conveniently increased in that one cross-link tying together two chains gives the same molecular weight as if two equivalent PVB chains were added together end to end. The latter is thought to require a difficult synthesis of special, high molecular weight PVOH's and polyvinyl acetate precursors.

The level of cross-linking should not be so low as to provide no effect on the resulting sheet properties in comparison with sheet from uncross-linked PVB but, on the other hand, it should not be so high as to adversely affect sheet properties. For example, at too high a cross-link level, the sheet will be too stiff and most likely will perform poorly during handling and laminating. The concentration of formaldehyde used in the cross-linking reaction should be adequate to lightly cross-link the PVB resin, by which is meant that the viscosity of such cross-linked resin is about 2% to about 85% greater than such viscosity in the absence of the diacetal cross-linkages. As will be apparent to one skilled in the art, the high temperature properties of a plasticized sheet formed from such a lightly cross-linked PVB resin can be conveniently selectively controlled by the extent of cross-linking or, in other words, by the amount of formaldehyde hydrate cross-linking agent available to develop such cross-links. To achieve the viscosity percentage increases stated, the viscosity of the lightly cross-linked PVB resin (7.5 weight % solution in methanol at 20° C.) will be between about 90 cps (0.09 Pa.s) to about 325 cps (0.325 Pa.s) and is preferably between about 150–260 cps (0.150–0.260 Pa.s). At these viscosities, the concentration of formaldehyde used (100% basis) should be between about 3 to about 15 and preferably 5 to 12 parts of formaldehyde per hundred parts of polyvinyl alcohol.

PVOH useful in forming the lightly cross-linked PVB of this invention is the product of the acid or base catalyzed hydrolysis of a polyvinyl ester (usually polyvinyl acetate) which is suitable for the production of PVB by condensation with butyraldehyde. Such PVOH comprises products of a substantially complete as well as incomplete hydrolysis, the latter including those where hydrolysis is purposely stopped short of completion. PVB resin made from such products of incomplete hydrolysis differ in the residual content of polyvinyl ester. Useful PVOH's can contain residues of unhydrolyzed vinyl ester in their molecules in amounts up to 5% by weight (calculated as polyvinyl acetate), although amounts on the order of about 0 to 2.5% by weight of polyvinyl acetate are preferred when the PVB resin is to be used in making interlayer sheeting for safety glass.

Lightly cross-linked PVB resin is produced according to this invention by the known aqueous acetalization process wherein the PVOH hydrolysis product is reacted with butyraldehyde in the presence of an acid catalyst to produce PVB, followed by neutralization of the catalyst, separation, stabilization and drying of the PVB resin. The formaldehyde can be added to the catalyzed condensation reaction mixture before or simultaneously with the butyraldehyde. More specifically, acetalization and cross-linking are carried out by adding butyraldehyde and formaldehyde to a water solution of PVOH at a temperature on the order of about 20° C., in the presence of an acid catalyst, agitating the mixture to cause an intermediate PVB to precipitate in finely divided form and continuing the agitation while heating until the reaction mixture has proceeded to the desired end point.

The lightly cross-linked PVB resins of the invention have Staudinger molecular weights ranging from about 30,000 to 600,000 and preferably from 145,000 to 270,000 and may be considered to be made up on a weight basis, of from 5 to 30% hydroxyl groups, calculated as polyvinyl alcohol, 0 to 5% ester groups, calculated as polyvinyl ester, and the balance substantially butyral groups. The PVB resin preferably contains, on a weight basis, from 11 to 25% hydroxyl groups, calculated as polyvinyl alcohol, and from 0 to 2.5% acetate groups, calculated as polyvinyl acetate, the balance being substantially butyral groups. The extent of cross-linking is so low in the present invention that the effect on the residual hydroxyl content of the PVB resin cannot presently be measured.

The lightly cross-linked PVB resin of the invention can be converted into sheet form which has a balance of performance properties making it useful as an interlayer in safety glass assemblies. The melt viscosity of the lightly cross-linked PVB resin at 120° C. will be between about $2 \times 10^5$ and about $3.5 \times 10^5$ poise (0.2 to $0.35 \times 10^5$ Pa.s) and preferably between about $2.50 \times 10^5$ and about $3.05 \times 10^5$ poise ($0.250 \times 10^5$ and $0.305 \times 10^5$ Pa.s).

In forming the extruded interlayer sheet, the lightly cross-linked PVB resin must be plasticized with from about 20 to 80 parts plasticizer per hundred parts of resin and more commonly between 25 and 45 parts for normal laminated safety glass use. This latter concentration is generally used with polyvinyl butyrals containing 17 to 25% vinyl alcohol by weight. In general, plasticizers commonly employed are esters of a polybasic acid or a polyhydric alcohol. Particularly suitable plasticizers are triethylene glycol di-(2-ethyl butyrate), dihexyl adipate, dioctyl adipate, mixtures of heptyl and nonyl adipates, dibutyl sebacate, polymeric plasticizers such as the oil-modified sebacid alkyds, and mixtures of phosphates and adipates such as are disclosed in U.S. No. 3,841,890 and adipates and alkyl benzyl phthalates such as disclosed in U.S. No. 4,144,217. Other suitable plasticizers are well known or will be obvious to those skilled in the art.

The extruded interlayer formed from plasticized, lightly cross-linked PVB resin according to this invention can be prepared by extrusion through a sheeting die, having water-cooled die lips i.e. forcing molten polymer through a long, narrow die opening substantially conforming in length and width to that of the sheet being formed therein or by casting the molten polymer issuing from an extrusion die onto a specially prepared surface of a die roll positioned in close proximity to the exit of such die which imparts the desired surface characteristics to one side of the molten polymer. Thus, when the surface of such roll has minute peaks and valleys, sheet formed of polymer cast thereon will have a rough surface on the side which contacts the roll which generally conforms respectively to the valleys and peaks of the roll surface. Further details of construction of such a die roll are disclosed in U.S. No. 4,035,549, col. 3, line 46 through col. 4, line 44, the content of which is incorporated herein by reference.

A rough surface on the other side of the extruded interlayer formed in a die roll extrusion system can be provided by the design of the die opening through which the extrudate passes. Such a die opening configuration is generally shown in FIG. 4 of U.S. No. 4,281,980, the content of such figure being incorporated herein by reference. When the outermost end portion of die lip 5 in such figure in the direction of extrusion is parallel with a tangent to the surface of the opposing rotating die roll, and the remaining rearward portion of such lip is at an angle of between about 2 to 7 degrees with such tangent, a rough surface will automatically be generated on the side of the extruded interlayer which is opposite to that formed by the die roll surface.

In addition to plasticizers, interlayers according to this invention may contain other additives such as dyes, ultraviolet light stabilizers, antioxidants, salts to control adhesion and may, if desired, be treated with additives to improve laminating efficiency.

The following procedures were used in obtaining the values for the various properties presented herein:

Melt or complex viscosity of the plasticized lightly cross-linked PVB with a Rheometric Mechanical Spectrometer at a frequency of 6.3 radians/sec. The sample was placed between two parallel plates oscillating at such frequency.

Viscosity by a capillary tube viscometer—Cannon Fenske #400.

The invention is further described with reference to the following Examples which are for illustration only and are not intended to imply any limitation or restriction on the invention. Unless otherwise indicated, all quantities are expressed by weight.

EXAMPLES 1-2

Polyvinyl alcohol (PVCH) resin having a residual polyvinyl acetate content of less than 2% was dissolved with agitation in water at 90-95° C. to form an 8% solution. 5524kg of this PVOH solution was charged to an agitated reactor and its temperature adjusted to 18° C. To this solution was added 267kg of butyraldehyde and 89.8kg of 50% formaldehyde which decreased the temperature to about 16° C. Water (400kg) and nitric acid (16kg of 35% water solution) were then charged and the mixture held for 1.25 h at between 16 and 20° C. A second charge of 46.5kg of nitric acid was added 1 h after the initial nitric acid charge. After 1.25 h the mixture was heated over 2 h to 75° C. and held thereat for 2.5 h. The contents of the reactor was transferred to an agitated hold tank and washed with water at 75° C. to a pH of 4.0. Potassium hydroxide water solution was then charged to provide a pH of 9.5-10.5 and the contents held at this pH for 3 h at 75° C. Additional water at 75° C. was then added to decrease the pH to 7.5. The PVB slurry was centrifuged and dried to less than 2% moisture. The viscosity of the dried PVB resin was measured and the following results were obtained:

TABLE 1

| Ex. | 50% Formaldehyde charged (kg) | PVB viscosity (cps) (Pa.s) |
|---|---|---|
| 1 | 0 | (175) (0.175) |
| 2 | 89.8 | (269) (0.269) |

The foregoing results in Table 1 illustrate the preparation of PVB lightly cross-linked through intermolecular linkages achieved through the presence of formaldehyde hydrate formed from 10 parts of formaldehyde (100%) per hundred parts of PVOH as the cross-linking agent in the aqueous acetalization of PVOH with butyraldehyde. That cross-linking occurred is shown by the 54% increase in the viscosity of the PVB that occurred when the formaldehyde was used in Example 2 in comparison with that of control Example 1.

EXAMPLES 3-4

These examples illustrate preparation of a plasticized sheet made from the lightly cross-linked PVB of Example 2.

32 parts of dihexyl adipate plasticizer were mixed with 100 parts of the cross-linked PVB resin of Example 2 in a high intensity mixer. The plasticized PVB resin was then melted in an extruder and forced in melt form through a die opening onto the surface of an adjacent rotating die roll of the type previously described which had internal cooling means which regulated the temperature of a die blade in contact with the polymer melt at about 104° C. The melt was at about 190° C. and the pressure at the die was 2411-2756kPa. The extruded sheet had a thickness of about 0.8mm and issued from the die roll at about 45 meters per minute. The die lip of the die opening as previously described was formed with a compression angle of about 4 degrees. Each side of the extruded sheet was formed with a rough surface. The melt viscosity of the plasticized cross-linked PVB resin (Example 3) was measured and compared with a control (Example 4 and the following results were obtained:

TABLE 2

| Example | PVB | Melt viscosity(p) (Pa.s) $(10^{-5})$ @ 120° C. |
|---|---|---|
| 3 | cross-linked | (2.87) (0.287) |
| 4 | control | (2.80) (0.280) |

The foregoing results in Table 2 illustrate preparation of plasticized PVB sheet lightly crosslinked through intermolecular linkages achieved through the presence of formaldehyde hydrate as the crosslinking agent in forming the PVB from which the sheet was formed. That the cross-links survived the extrusion operation in forming the sheet from the melt is shown by the increased melt viscosity obtained with the cross-linked PVB (Example 3) in comparison with the uncrosslinked control (Example 4).

The preceding description is set forth for purposes of illustration only and is not to be taken in a limited sense. Various modifications and alterations will be readily suggested to persons skilled in the art. It is intended, therefore, that the foregoing be considered as exemplary only and that the scope of the invention be ascertained from the following claims.

I claim:

1. Plasticized polyvinyl butyral sheet lightly cross-linked through intermolecular linkages developed through the hydrated form of formaldehyde, such cross-links being adequate to increase the viscosity of the polyvinyl butyral used to form the sheet by about 2% to about 85% over its viscosity in the absence of such cross-links.

* * * * *

UNITED STATES PATENT AND TRADEMARK OFFICE
CERTIFICATE OF CORRECTION

PATENT NO. : 4,950,714
DATED : August 21, 1990
INVENTOR(S) : George E. Cartier

It is certified that error appears in the above-identified patent and that said Letters Patent is hereby corrected as shown below:

In the Abstract, line 2, after the word through, insert the following ---use of the hydrated form of formaldehyde to selectively---.

In col. 2, line 53, "PVCH" should read, instead, ---PVOH---.

In col. 5, line 21, "PVCH" should read, instead, ---PVOH---.

Signed and Sealed this

Eleventh Day of February, 1992

*Attest:*

HARRY F. MANBECK, JR.

*Attesting Officer*  *Commissioner of Patents and Trademarks*